United States Patent
Ogasawara et al.

(10) Patent No.: US 10,724,630 B2
(45) Date of Patent: Jul. 28, 2020

(54) GEARSHIFT CONTROL DEVICE OF AUTOMATIC TRANSMISSION

(71) Applicants: JATCO Ltd, Fuji-shi, Shizuoka (JP); NISSAN MOTOR CO., LTD., Yokohama-shi, Kanagawa (JP)

(72) Inventors: Shunsuke Ogasawara, Isehara (JP); Hiroaki Shiokawa, Kawasaki (JP); Yuichiro Matsunaga, Kanagawa (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 340 days.

(21) Appl. No.: 15/551,269

(22) PCT Filed: Feb. 9, 2016

(86) PCT No.: PCT/JP2016/053727
§ 371 (c)(1),
(2) Date: Aug. 15, 2017

(87) PCT Pub. No.: WO2016/132953
PCT Pub. Date: Aug. 25, 2016

(65) Prior Publication Data
US 2018/0066749 A1    Mar. 8, 2018

(30) Foreign Application Priority Data
Feb. 16, 2015 (JP) .................... 2015-028008

(51) Int. Cl.
*F16H 61/02*    (2006.01)
*F16H 61/10*    (2006.01)
(Continued)

(52) U.S. Cl.
CPC ......... *F16H 61/0213* (2013.01); *F16H 61/10* (2013.01); *F16H 59/18* (2013.01); (Continued)

(58) Field of Classification Search
CPC ...... F16H 61/00; F16H 61/10; F16H 61/0213; F16H 59/18; F16H 59/44; F16H 59/45;
(Continued)

(56) References Cited

U.S. PATENT DOCUMENTS

| | | | |
|---|---|---|---|
| 2003/0100403 A1* | 5/2003 | Kato | F16H 61/061 477/123 |
| 2003/0203790 A1 | 10/2003 | Matsubara et al. | |
| 2007/0173372 A1* | 7/2007 | Ueno | B60K 6/48 477/3 |
| 2007/0259755 A1* | 11/2007 | Tanishima | B60K 6/387 477/3 |

(Continued)

FOREIGN PATENT DOCUMENTS

| | | |
|---|---|---|
| JP | H06-123346 A | 5/1994 |
| JP | 2003-322249 A | 11/2003 |

(Continued)

OTHER PUBLICATIONS

Japanese Office Action and its machine translation issued in corresponding application No. 2017-500611 dated May 8, 2018.

*Primary Examiner* — Jacob S. Scott
*Assistant Examiner* — Lori Wu
(74) *Attorney, Agent, or Firm* — Foley & Lardner LLP

(57) ABSTRACT

In a control apparatus for an automatic transmission, in a drive train, a driving source and the automatic transmission having a plurality of gear-shift stages including the gear-shift stages at each of which a one way clutch is engaged during a drive are equipped, a gear-shift line correction by such coast correction lines as to provide such gear-shift line shapes projecting toward a lower vehicle speed side in a small accelerator opening area is added to up-shift lines of the gear-shift stages at each of which the one way clutch participates from among the gear-shift lines after the correction by vehicle speed correction lines.

9 Claims, 9 Drawing Sheets

(51) Int. Cl.
*F16H 61/00* (2006.01)
*F16H 59/18* (2006.01)
*F16H 59/44* (2006.01)
*F16H 59/78* (2006.01)

(52) U.S. Cl.
CPC .............. *F16H 59/44* (2013.01); *F16H 59/78* (2013.01); *F16H 2061/0096* (2013.01); *F16H 2061/0223* (2013.01); *F16H 2061/0232* (2013.01); *F16H 2061/0241* (2013.01)

(58) Field of Classification Search
CPC ..... F16H 2061/0223; F16H 2061/0232; F16H 2061/0096; F16H 2061/0241; F16H 2200/2066; F16H 2200/2069; F16H 2200/2082; F16H 2200/2084
See application file for complete search history.

(56) References Cited

U.S. PATENT DOCUMENTS

| | | | |
|---|---|---|---|
| 2010/0010716 A1* | 1/2010 | Sawada | B60W 10/06 701/52 |
| 2012/0083978 A1 | 4/2012 | Tajima et al. | |
| 2015/0239469 A1* | 8/2015 | Yoshikawa | F16H 59/18 701/51 |

FOREIGN PATENT DOCUMENTS

| | | |
|---|---|---|
| JP | 2004-270814 A | 9/2004 |
| JP | 2010-143361 A | 7/2010 |
| JP | 2011-231907 A | 11/2011 |

* cited by examiner

FIG.2

(○) INDICATES THE ENGAGEMENT STATE DURING AN ENGINE BRAKING

|  | I/C | D/C | H&LR/C | F/B | LOW/B (FWD/B) | 2-3-4-6/B (BR1) | REV/B | 1st OWC | 2nd OWC |
|---|---|---|---|---|---|---|---|---|---|
| 1st |  |  | (○) | (○) | ○ |  |  | ○ | ○ |
| 2nd |  |  | (○) |  | ○ | ○ |  |  | ○ |
| 3rd |  | ○ |  |  | ○ | ○ |  |  |  |
| 4th |  | ○ | ○ |  |  | ○ |  |  |  |
| 5th | ○ | ○ | ○ |  |  |  |  |  |  |
| 6th | ○ |  | ○ |  |  | ○ |  |  |  |
| 7th | ○ |  |  | ○ |  |  |  |  |  |
| Rev |  |  | (○) | (○) |  |  | ○ | ○ | ○ |
|  | C1 | C2 | C3 | B1 | B2 | B3 | B4 | F1 | F2 |

|  |  | a | b | c |
|---|---|---|---|---|
| Up | 1⇒2 | a1 | b1 | c1 |
|  | 2⇒3 | a2 | b2 | c2 |
|  | ... | ... | ... | ... |
|  | 6⇒7 | a6 | b6 | c6 |
| Down | 2⇒1 | a7 | b7 | c7 |
|  | 3⇒2 | a8 | b8 | c8 |
|  | ... | ... | ... | ... |
|  | 7⇒6 | a12 | b12 | c12 |

X = 8

ENLARGED VIEW

X = 10

ENLARGED VIEW

GEARSHIFT CONTROL DEVICE OF AUTOMATIC TRANSMISSION

TECHNICAL FIELD

The present invention relates to a warm-up promotion control apparatus for an automatic transmission having a plurality of gear-shift stages including the gear-shift stages at each of which a one way clutch is engaged during a drive.

BACKGROUND ART

Conventionally, in order to promote an engine warm-up, there is provided with a normal mode purpose gear-shift map and a warm-up promotion purpose gear-shift map. In a case where an engine cooling water (coolant) temperature is a low temperature, a switching to the gear-shift using the warming-up purpose gear-shift map is carried out. It should herein be noted that, since the warm-up promotion purpose gear-shift map has a switching gear-shift line from a low speed stage to a high speed stage which is set to be offset toward a higher vehicle speed side in order to increase an engine rotation speed according to such a tendency as to expand a selection of the low speed stage. In addition, a stepped automatic transmission having a one way clutch which is engaged at the low speed stage in the driving state and which runs idle in a coast state (for example, refer to Patent Document 1).

PRE-PUBLISHED DOCUMENT

Patent Document 1: a Japanese Patent Application Laid-open Publication No. H06-123346.

DISCLOSURE OF THE INVENTION

Problem to be Solved by the Invention

However, in a case where the gear-shift is carried out using the warm-up promotion purpose gear-shift map in which the gear-shift lines are offset toward the higher vehicle speed side as an engine warm-up promotion control, when an accelerator depression operation is again carried out after a foot separation from the accelerator, a driving point does not traverse any of the gear-shift lines offset toward the higher vehicle speed side so that neither an up-shift nor a down-shift is carried out. The one way clutch which is engaged when the state is transferred to a coast state due to the accelerator foot separation operation runs idle and, thereafter, where the state is transferred to the driving state due to the accelerator again depression operation, the one way clutch which has run idle is abruptly engaged.

Hence, such a problem that a drive feeling due to a generation of a neutral feeling according to an idle run of the one way clutch becomes worsened and a G variation of an output shaft due to an abrupt engagement of the one way clutch causes a large one way clutch engagement shock is raised. In more details, when the up-shift line and the down-shift line are offset toward the higher vehicle speed side, the gear-shift does not occur to the higher vehicle speed side than a vehicle speed at which the gear-shift naturally occurs. Hence, during an engagement of the one way clutch, a driven side inertia becomes larger than the case using the normal mode purpose shift lines. Consequently, such a cause that a gap between the engine side rotation speed and the output (shaft) side rotation speed becomes large is generated.

It is, with the above-described problem in mind, an object of the present invention to provide a control apparatus for an automatic transmission which serves to prevent a worsening of a feeling and prevent a generation of a one way clutch engagement shock, when an operation (by a vehicle driver) in which an accelerator foot separation from an accelerator (pedal) is carried out and, thereafter, an accelerator foot depression is again carried out while driving source rotation number (speed) is maintained at a high rotation speed.

Means for Solving the Problem

In order to achieve the above-described object, according to the present invention, in a drive train, a driving source and an automatic transmission having a plurality of gear-shift stages including gear-shift stages at each of which a one way clutch is engaged during a drive are equipped.

Gear-shift control means is provided for performing a gear-shift control for the automatic transmission according to a position of a driving point present in a gear-shift map, using the driving point determined according to a vehicle speed and an accelerator opening angle and a gear-shift map constituted by up-shift lines and down-shift lines.

In the control apparatus for this automatic transmission, when a gear-shift line correction request occurs, gear-shift line corrective control means is provided for correcting the up-shift lines and the down-shift lines in the gear-shift map by vehicle speed correction lines set toward a higher vehicle speed side than the gear-shift line vehicle speeds before the correction.

The gear-shift line correction control means adds a gear-shift line correction such that a correction quantity toward the higher vehicle speed side in a small accelerator opening angle area is made smaller than another correction quantity toward the higher vehicle speed side in a large accelerator opening angle area whose acceleration opening angle is larger than the small accelerator opening angle area to the up-shift lines of the gear-shift stages at each of which the one way clutch is engaged during a drive, from among the gear-shift lines after the correction by the vehicle speed correction lines.

In other words, the gear-shift line correction by coast correction lines which project the small accelerator opening angle area toward a lower vehicle speed side is added.

Effect of the Invention

Hence, the gear-shift line correction by the coast correction lines which serve to project the small accelerator opening angle area including zero accelerator opening angle toward the lower vehicle speed side is added to the up-shift lines of the gear-shift stages at each of which the one way clutch is engaged during the drive from among the gear-shift lines after the correction by the vehicle speed correction lines.

That is, since, when the operation of the accelerator foot separation is carried out, the accelerator opening angle is reduced and a driving point traverses a corresponding one of the coast correction lines which corrects the corresponding one of the up-shift lines, the up-shift is carried out not using the one way clutch by a frictional engagement element. Hence, even if the accelerator foot separation operation is carried out, the one way clutch does not run idle. Then, even if the accelerator depression operation after the state in which the accelerator foot separation operation is again carried out, the gear-shift stage after the up-shift is maintained and the one way clutch is not engaged.

Consequently, when the accelerator depression operation is again carried out from the accelerator foot separation while the rotation speed of the driving source is maintained at the high rotation speed, the worsening of the driving feeling and the generation of the engagement shock of the one way clutch can be prevented.

BRIEF DESCRIPTION OF THE DRAWINGS

FIG. 2 is an engagement operation table representing engagement states of respective frictional engagement elements for each of gear-shift stages in the automatic transmission in the first preferred embodiment.

EMBODIMENT FOR CARRYING OUT THE INVENTION

Figure 1:
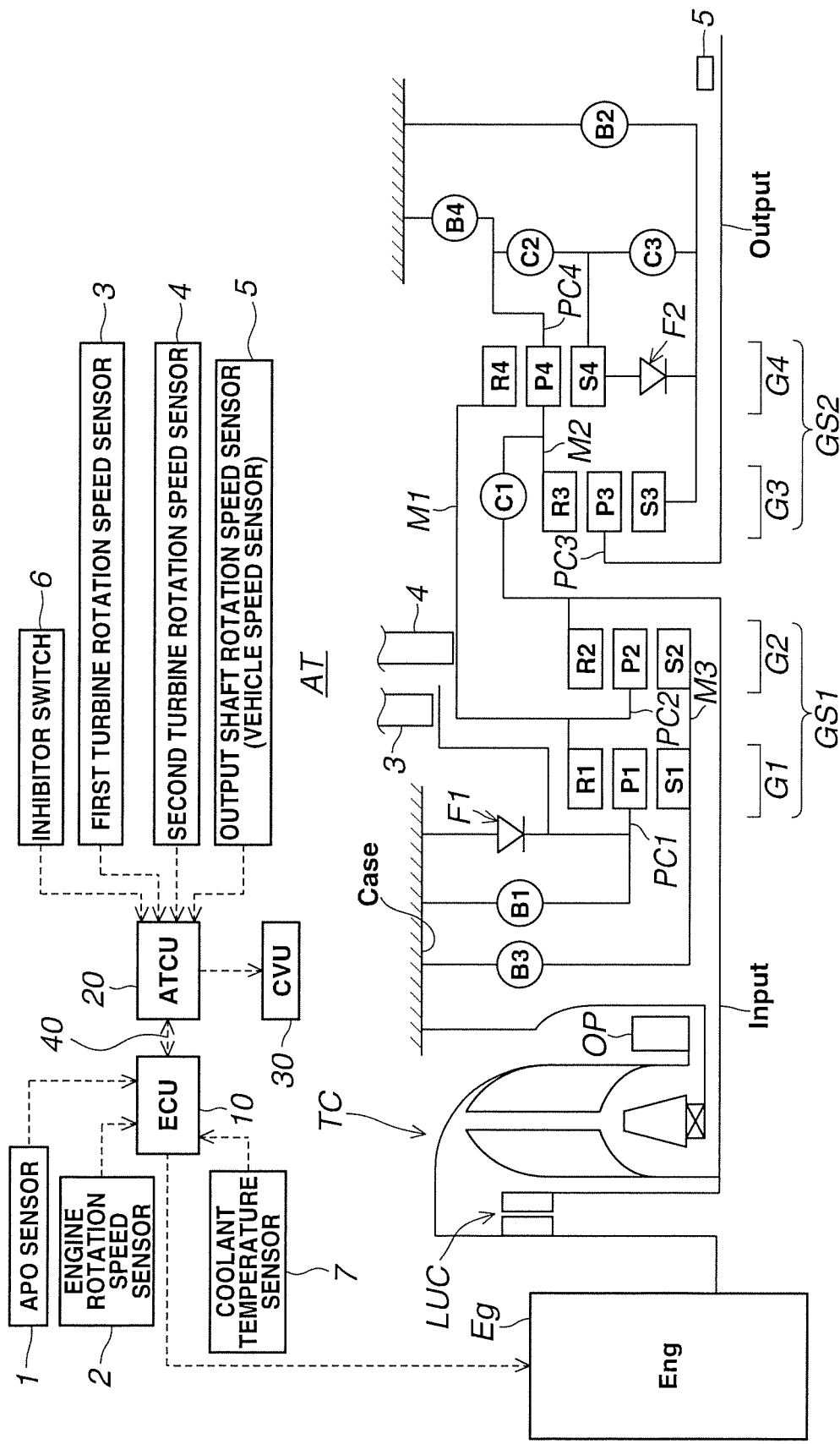
FIG. 1 is a whole system configuration view representing a drive train and a control system of an engine mounted vehicle in which an automatic transmission to which a control apparatus in a first preferred embodiment (embodiment 1) is applicable.

Hereinafter, a best preferred embodiment realizing a control apparatus for an automatic transmission according to the present invention will be explained on a basis of a first preferred embodiment (embodiment 1) shown in the drawings.

Embodiment 1

First, a structure will be explained.

A control apparatus in a case of a first preferred embodiment is applied to an engine mounted vehicle in which a forward 7-th speed and reverse 1-st speed stepped automatic transmission is mounted. Hereinafter, an explanation of the structure of the control apparatus for the automatic transmission in the first embodiment (embodiment 1) will be divided into "a whole system configuration", "a power train structure of automatic transmission", and "a structure of a gear-shift control of the automatic transmission", and "a structure of processing of a gear-shift line correction control".

[A Whole System Configuration]

FIG. 1 shows a drive train and a control system of an engine mounted vehicle in which an automatic transmission in the first embodiment is mounted. Hereinafter, FIG. 1 shows a whole system configuration view.

The drive train of the engine mounted vehicle includes an engine Eng and an automatic transmission AT, as shown in FIG. 1.

Above-described automatic transmission AT is a stepped automatic transmission called a stepped AT with a forward 7 speeds and reverse 1 speed. A driving force of engine Eng is inputted from an input shaft Input via a torque converter TC having a lock-up clutch LU/C. Then, a number of rotations is gear-shifted by means of four planetary gears and seven frictional engagement elements and is outputted to driving wheels (not shown) from an output shaft Output. An oil pump OP is coaxially mounted together with a pump impeller of torque converter TC and is rotationally driven with the driving force of engine Eng to apply pressure onto oil.

The control system of engine mounted vehicle includes an engine controller 10 (ECU), an automatic transmission controller 20 (ATCU), and a control valve unit 30 (CVU). A CAN communication line 40 is used to connect between engine controller 10 and automatic transmission controller 20 and sensor information and control information are used in common to these controllers 10 and 20 by bi-directional information. Especially, engine controller 10 transmits a signal X representing a degree of a gear-shift line correction request in an engine warm-up promotion control carried out in a low temperature start of engine Eng to automatic transmission controller 20 via CAN communication line 40.

Engine controller 10 serves as control means for mainly performing a drive state control of engine Eng. An accelerator opening angle sensor 1 which detects an accelerator (pedal) opening angle APO representing an accelerator pedal operating variable of a driver, an engine rotation speed sensor 2 which detects an engine rotation speed Ne of engine Eng, and a coolant temperature sensor 7 which detects an engine coolant temperature Teng are connected to engine controller 10. This engine controller 10 controls an engine rotation speed Ne and an engine torque by adjusting a fuel injection quantity and a throttle opening angle on a basis of engine rotation speed Ne and accelerator opening angle APO. When engine coolant temperature Teng is in a low temperature range equal to or lower than a set temperature range, signal X (for example, X=1 through 10) representing the degree of the gear-shift line correction request is outputted to automatic transmission controller 20 as the engine warm-up promotion control.

Above-described automatic transmission controller 20 is control means for mainly performing a gear-shift control of automatic transmission AT.

A first turbine rotation speed sensor 3 detecting a rotation speed of a first carrier PC1 and a second turbine rotation speed sensor 4 detecting a rotation speed of a first ring gear R1 are connected to automatic transmission controller 20. Furthermore, an output shaft rotation speed sensor 5 (a vehicle speed sensor) for detecting a rotation speed of an output shaft Output (=vehicle speed VSP) and an inhibitor switch 6 detecting a range position selected by a select lever for a driver are connected to automatic transmission controller 20. When signal X representing the degree of the gear-shift line correction request is inputted from engine controller 10, automatic transmission controller 20 performs a coordinate gear-shift control which promotes an engine warm-up by increasing the engine rotation speed to a high rotation speed through the gear-shift line correction of a gear-shift map.

Above-described control valve unit 30 is constituted by solenoid valves and oil passages which control engagements/releases of the respective frictional engagement elements on a basis of control commands issued from automatic transmission controller 20.

[Power Train Structure of Automatic Transmission]

Hereinafter, on a basis of FIG. 1, the power train structure of automatic transmission AT will be explained.

In above-described automatic transmission AT, as shift gears, a first planetary gear set GS1 constituted by a first planetary gear G1 and a second planetary gear G2 in this sequence and a second planetary gear set GS2 constituted by a third planetary gear GS3 and a fourth planetary gear GS4 are arranged on an axle from input shaft Input side to output shaft Output side. In addition, as hydraulically controlled frictional engagement elements, a first clutch C1, a second clutch C3, a third clutch C3, a first brake B1, a second brake B2, a third brake B3, and a fourth brake B4 are arranged. Furthermore, as a one way clutch which mechanically engages and/or runs idle, a first one way clutch F1 and a second one way clutch F2 are arranged.

Above-described first planetary gear G1 is a single pinion type planetary gear including a first sun gear S1, a first ring gear R1, and a first carrier PC1 supporting a first pinion P1 meshed with both ring gears S1, R1.

Above-described second planetary gear G2 is a single pinion type planetary gear including a second sun gear S2, a second ring gear R2, and a second carrier PC2 supporting a second pinion P2 meshed with both ring gears S2, R2.

Above-described third planetary gear G3 is a single pinion type planetary gear including a third sun gear S3, a third ring gear R3, and a third carrier PC3 supporting a third pinion P3 meshed with both ring gears S3, R3.

Above-described fourth planetary gear G4 is a single pinion type planetary gear including a fourth sun gear S4, a fourth ring gear R4, and a fourth carrier PC4 supporting a fourth pinion P4 meshed with both ring gears S4, R4.

Input shaft Input is linked to a second ring gear R2 and a rotational driving force from engine Eng is inputted via torque converter TC or so forth. Output shaft Output is linked to third carrier PC3, an output rotational driving force thereof being transmitted to the driving wheels via a final gear or so forth.

First ring gear R1, second carrier PC2, and fourth ring gear R4 are integrally linked together via a first linkage member M1.

First planetary gear set GS1 is constituted by four rotational elements by a linkage between first planetary gear G1 and second planetary gear G2 with first linkage member M1 and third linkage member M3. In addition, second planetary gear GS2 is constituted by five rotational elements by the linkage between third planetary gear G3 and fourth planetary gear G4 with second linkage member M2.

In first planetary gear set GS1, a torque is inputted from input shaft Input to second ring gear R2 and the inputted torque is outputted to second planetary gear set GS2 via first linkage member M1. In second planetary gear set GS2, the torque is inputted directly to second linkage member M2 from input shaft Input and is inputted to fourth ring gear R4 via first linkage member M1. The inputted torque is outputted from third carrier PC3 to output shaft Output.

First clutch C1 (input clutch I/C) is a clutch selectively connect or disconnect input shaft Input to or from second linkage member M2. Second clutch C2 (direct clutch D/C) is a clutch selectively connect or disconnect fourth sun gear S4 to or from fourth carrier PC4. This clutch C3 (H & LSR clutch H&LR/C) is a clutch selectively connect or disconnect third sun gear S3 to or from fourth sun gear S4.

Second one-way clutch F2 is disposed between third sun gear S3 and fourth sun gear S4. Thus, third clutch C3 is released and, when the rotation speed of fourth sun gear S4 is larger than third sun gear S3, the rotation speeds of third sun gear S3 and fourth sun gear S4 generate rotation speeds independently from each other. Thus, third planetary gear G3 and fourth planetary gear G4 are connected via second linkage member M2 so that independent gear ratios of the planetary gears are achieved.

First brake B1 (front brake F/B) is a brake selectively stopping the rotation of first carrier PC1 to transmission casing Case. In addition, first one-way clutch F1 is arranged in parallel to first brake B1. Second brake B2 (low brake LOW/B) is a brake selectively stopping the rotation of third sun gear S3 to transmission casing Case. Third brake B3 (2, 3, 4, 6 brake 2-3-4-6/B) is a brake selectively stopping the rotation of third linkage member M3 to transmission casing Case.

Fourth brake B4 (reverse brake REV/B) is a brake selectively stopping the rotation of fourth carrier PC3 to transmission casing Case.

[A Structure of a Gear Shift Control of the Automatic Transmission]

FIG. 2 shows an engagement operation table representing engagement states of respective frictional engagement elements for each of the respective gear-shift stages in automatic transmission AT in the first embodiment.

It should be noted that, in FIG. 2, the mark of O indicates that a corresponding one of the frictional engagement elements is in an engagement state, the mark of (O) indicates that the corresponding one of the frictional engagement elements is in the engagement state during a coast in which an engine braking is operated, and no mark indicates that the corresponding one of the frictional engagement elements is in a released state.

During an up shift and a down shift between mutually adjacent gear-shift stages in the automatic transmission, such a replacement gear-shift that the engaged one of the frictional engagement elements is released and the released one of the frictional engagement elements is engaged is carried out. This replacement gear shift can achieve gear-shift stages of forward 7-th speed and reverse 1st speed.

At a first speed stage during a driving due to a depression of accelerator (pedal), second brake B2 is in an engagement state and first one way clutch F1 and second one way clutch F2 are engaged. At the first speed stage during a coasting (an engine braking time) due to a foot separation from the accelerator, first one way clutch F1 and second one way clutch B2 are engaged. At a second speed stage during the drive due to the depression of the accelerator, second brake B2 and third brake B3 are in the engagement state and second one way clutch F2 is engaged. At the second speed stage during the coast travel (during the engine braking), second one-way clutch F2 runs idle so that each of third clutch C3, second brake B2, and third brake B3 is in the engagement state.

At a second speed stage during the driving due to the depression of the accelerator, second brake B2 and third brake B3 are in the engagement state and second one way clutch F2 is engaged. At the second speed stage during the coasting (during the engine braking), second one way clutch F2 runs idle so that each of third clutch C3, second brake B2, and third brake B3 is in the engagement state.

At a third speed stage, each of second brake B2, third brake B3, and second clutch C2 is in the engagement state in spite of (regardless of) the driving time or the coasting time.

At a fourth speed stage, each of second brake B2, third brake B3, and second clutch C2 is in the engagement state in spite of (regardless of) the driving time or the coasting time. At the fourth speed stage, each of third brake B3, second clutch C2, and third clutch C3 is in the engagement state in spite of (regardless of) the driving time or coasting time. At a fifth speed stage, each of third brake B3, second clutch C2, and third clutch C3 is in the engagement state in spite of the drive time or coast time. At the fifth speed stage, each of first clutch C1, second clutch C2, and third clutch C3 is in the engagement state in spite of the drive time or coast time.

At a sixth speed stage, each of third brake B3, first clutch C1, and third clutch C3 is in the engagement state. At a seventh speed stage, each of first brake B1, first clutch C1, and third clutch C3 is in the engagement state in spite of the drive time or the coast time.

At a reverse speed stage during the drive time due to the depression of accelerator, fourth brake B4 is in the engagement state and first one way clutch F1 and second one way clutch F2 are engaged.

At the reverse speed stage during the coasting time (during the engine braking) due to the foot separation from the accelerator, first one way clutch F1 and second one way clutch F2 run idle so that each of third clutch C3, first brake B1, and fourth brake B4 is in the engagement state.

Figure 3:
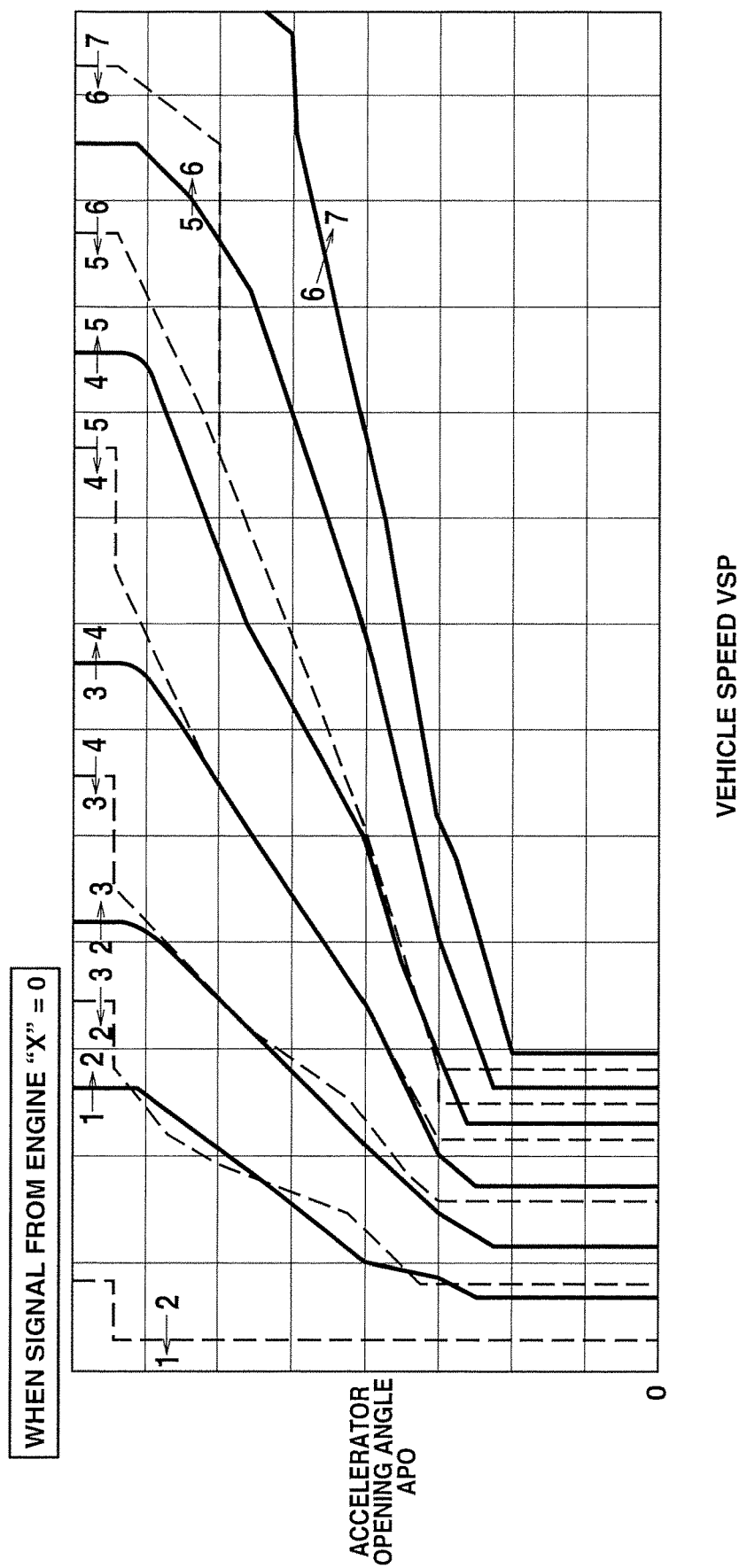
FIG. 3 is a gear-shift map view representing a reference gear-shift map used in a gear-shift control when a signal "X" from an engine=0 in the automatic transmission in the first preferred embodiment.

FIG. 3 shows a gear-shift map view representing a reference gear-shift map used in the gear-shift control when signal "X"=0 from the engine, in automatic transmission AT in the first embodiment. It should be noted that the reference gear-shift map shown in FIG. 3 is previously stored (pre-stored) in a memory of automatic transmission controller 20. When the gear-shift line correction control as will be described later is executed, the reference gear-shift map is used as a gear-shift map before the correction (a pre-correction gear-shift map). In other words, when the signal "X" representing the degree of gear-shift line correction request from engine controller 10 is "X"=0 (no gear-shift line correction request is made), the reference gear-shift map shown in FIG. 3 is selected. In addition, in the reference gear-shift map shown in FIG. 3, each of solid lines denotes an up-shift line and each of dotted lines denotes a down-shift line.

During the selection of D range which is "X"=0, automatic transmission controller 20 searches for a position of a driving point (VSP, APO) determined on a basis of vehicle speed VSP from output shaft rotation speed sensor 5 (=vehicle speed sensor) and accelerator opening angle APO from accelerator opening angle sensor 1, present on the gear-shift map. When the driving point (VSP, APO) is not moved or the driving point (VSP, APO) remains present within a single gear-shift stage area on the gear-shift map shown in FIG. 3 even if the driving point is moved, the gear-shift stage at this time (the instantaneous gear-shift stage is maintained as it is) is maintained.

On the other hand, when the driving point (VSP, APO) is moved and traverses (transverse) the up-shift line on the gear-shift map shown in FIG. 3, automatic transmission controller 20 outputs an up-shift gear-shift command from the gear-shift stage indicating the area present on the driving point (VSP, APO) before the transverse to the gear-shift stage indicating the area present on the driving point after the transverse (traverse). In addition, when the driving point (VSP, APO) is moved and transverses (traverses) the down-shift line on the gear-shift map shown in FIG. 3, automatic transmission controller 20 outputs a down-shift command to the gear-shift stage indicating the area in which the driving point (VSP, APO) after the transverse (traverse).

[A Structure of a Gear Shift Control of the Automatic Transmission]

Figure 4:
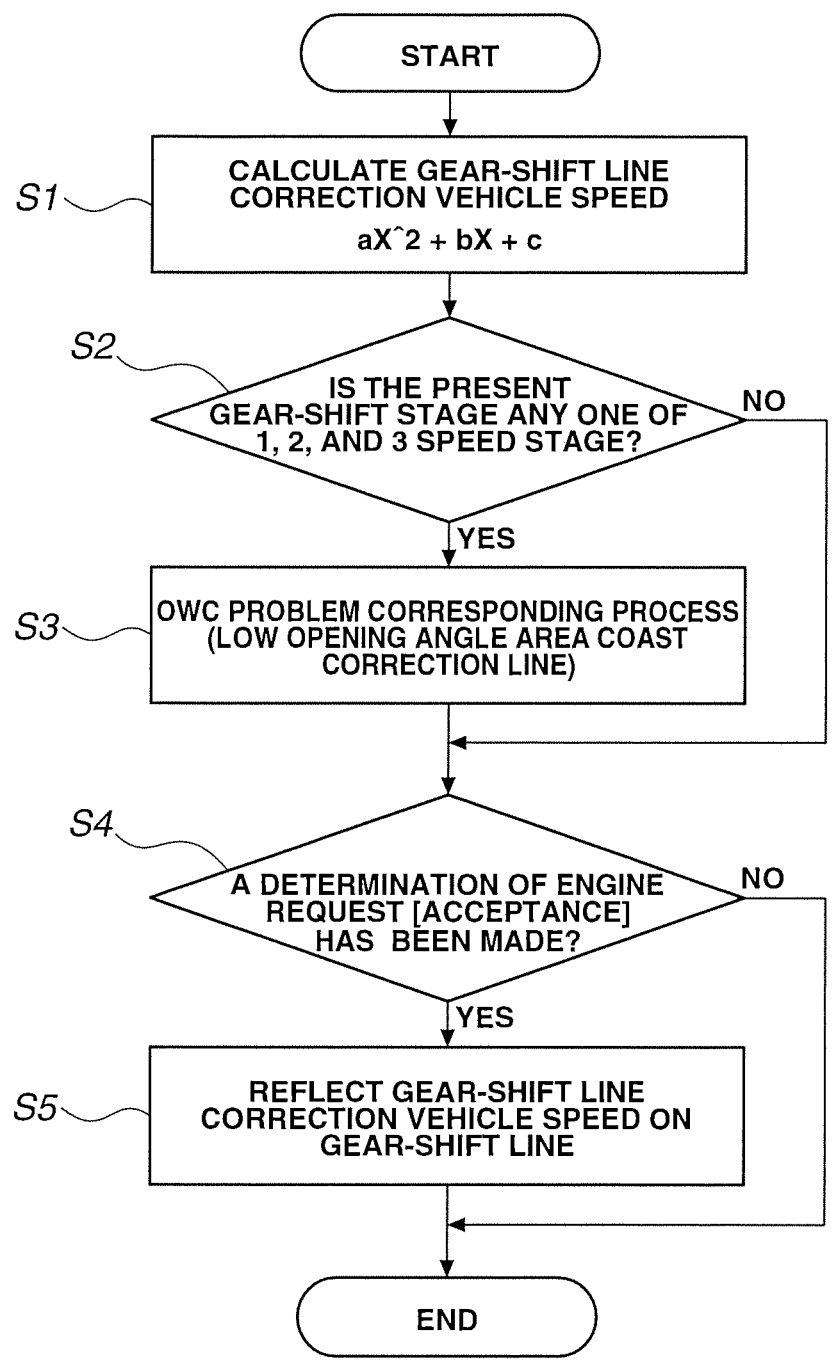
FIG. 4 is a flowchart representing a flow of a gear-shift line correction control processing executed in an automatic transmission controller in the first preferred embodiment.

FIG. 4 shows a flow of a gear-shift line correction control processing executed in automatic transmission controller 20 in the first embodiment (gear shift line correction control means). Hereinafter, each step of FIG. 4 representing the gear-shift line correction control processing structure.

At a step S1, a correction vehicle speed for the up-shift line and the down-shift line is calculated using the following equation (1) and the routine goes to a step S2.

$$\text{Correction vehicle speed} = a\,X^2 + bx + c \qquad (1)$$

It should be noted that "constants a, b, and c" in equation (1) are determined on a basis of multiple number of data obtained through experiments to conform a promotion effect of the engine warm up. Then, to each of 1→2 up-shift line, . . . , 6→7 up-shift line, and 2→1 down-shift line, . . . , 7→6 down-shift line, values of the constants by which the engine warm-up promotion effect is obtained are given.

"X" in equation (1) is a value representing the degree of the gear-shift line correction request in the engine warm-up promotion control. In this embodiment, any one of the values from X=0 (a value representing that no correction request of the gear-shift lines is made) to X=10 (a value representing a maximum gear-shift line correction request).

At a step S2, automatic transmission controller 20 determines whether, subsequently to the calculation of the gear-shift line correction vehicle speed, the present gear-shift stage is any one of the first speed stage, the second speed stage, and the third speed stage. If YES (the present stage is one of the first, second, and third speed stages, the routine goes to a step S3. If NO (the present stage is not any one of the first, second, and third speed stages, the routine goes to a step S4.

It should herein be noted that "the present gear-shift stage" is determined from a gear shift command information provided in automatic transmission controller 20. In addition, "the first speed stage", "the second speed stage", and "the third speed stage" are gear-shift stages at each of which at least one of a first one way clutch (OWC) F1 and a second one way clutch (OWC) F2 is engaged at a time of driving state (driving) when an up-shift (gear shift) or a down-shift (gear-shift) occurs.

At a step S3, subsequently to the determination that the present gear-shift stage is one of the first, second, and third speed stages, automatic transmission controller 20 carries out a one-way clutch problem corresponding processing in which the gear-shift lines are corrected by small opening angle area coast correction lines and the routine goes to step S4.

Figures 5, 6:
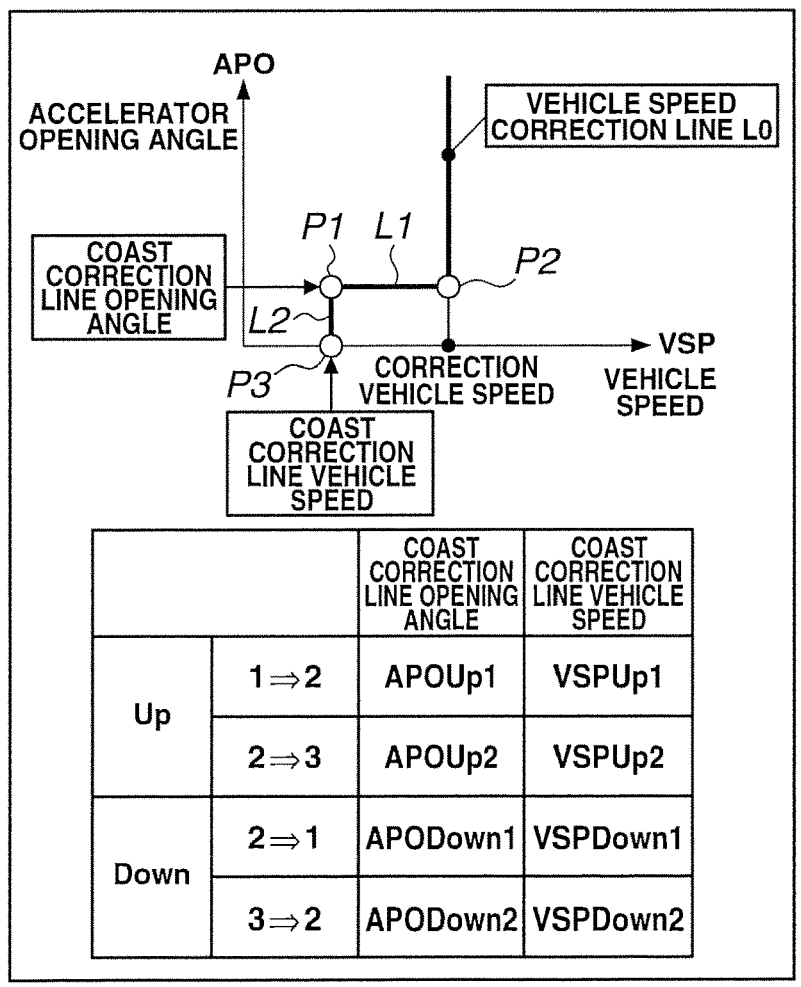
FIG. 5 is a constant table representing values of constants a, b, and c used in a gear-shift line correction vehicle speed calculation processing with respect to an up-shift line and a down-shift line, each having a one way clutch, in a gear-shift map.
FIG. 6 is a small opening angle area coast correction line explanatory view representing an explanation of how to give a coast correction line opening angle and a coast correction line vehicle speed in a one way clutch problem corresponding processing (a small angle area coast correction line processing) with respect to the up-shift line and down-shift of the gear-shift map.

It should herein be noted that "the gear-shift line correction by the small opening angle area coast correction lines" is, as shown in FIG. 6, carried out by determining a coast correction line opening angle in a small accelerator opening angle area with respect to a vehicle speed correction line according to the correction vehicle speed calculated at step S1 and a coast correction line vehicle speed in a lower vehicle speed area than the vehicle speed correction line. That is, an 1→2 up-shift (gear shift) line is given by a coast correction line opening angle APOUp1 and a coast correction line vehicle speed VSPUp1, a 2→3 up-shift line is given by a coast correction line opening angle APOUp2 and a coast correction line vehicle speed VSPUp2, a 2→1 down-shift line is given by a coast correction line opening angle APODown1 and a coast correction line vehicle speed VSP-Down1, and a 3→2 down-shift line is given by a coast correction line opening angle APODown2 and a coast correction line vehicle speed VSPDown2.

In addition, "one way clutch problem" refers to a neutral feeling due to an idle run of the one way clutch and a one way clutch engagement shock due to an accelerator depression operation from the idle run of the one way clutch.

It should herein be noted that the "small opening angle area coast correction lines" provide gear-shift line shapes such as to be projected like a tongue toward a low vehicle speed direction in the small opening angle area with respect to a (post correction) up-shift line after the correction and a (post correction) down-shift line after the correction corrected according to the vehicle speed correction lines.

At step S4, subsequently to the one way clutch problem corresponding procedure at step S3, automatic transmission controller 20 determines whether a determination of an engine request [acceptance] has been made. If YES (the determination of the engine request [acceptance] has been made), the routine goes to a step S5. If NO (the determination of the engine request [rejection]), the routine goes to end.

It should herein be noted that [the determination of the engine request [acceptance] ] is established when the following six acceptance conditions are satisfied.
1. An elapsed time from a time of engine start is shorter than a set time (for example, approximately several minutes).
2. The gear-shift determination vehicle speed is lower than a set vehicle speed (for example, 40 km/h).
3. Not under the gear-shift (the gear-shift is being carried out).
4. A mode of the gear-shift lines is "NORMAL mode".
5. A range other than N, R, and P ranges.
6. An abnormality in vehicle speed sensor 5 and inhibitor switch 6 is not detected.

On the other hand, "the determination of the engine request [rejection]" is established when at least one condition from among the following six rejection conditions is satisfied.

1. The elapsed time from the time of engine start is equal to or longer than the set time (for example, approximately several minutes).
2. The gear-shift determination vehicle speed is equal to or higher than the set vehicle speed (for example, 40 km/h).
3. Under the gear-shift.
4. The mode of the gear-shift lines is other than "NORMAL mode" (including MANUAL MODE).
5. The selected range is one of N, R, and P ranges.
6. The abnormality of the vehicle speed sensor 5 or inhibitor switch 6 is detected.

It should be noted that a method of the engine request [rejection] during the determination of the under the gear-shift of condition 3 is a retention of the gear-shift line correction map before the gear shift occurs.

Figure 7:
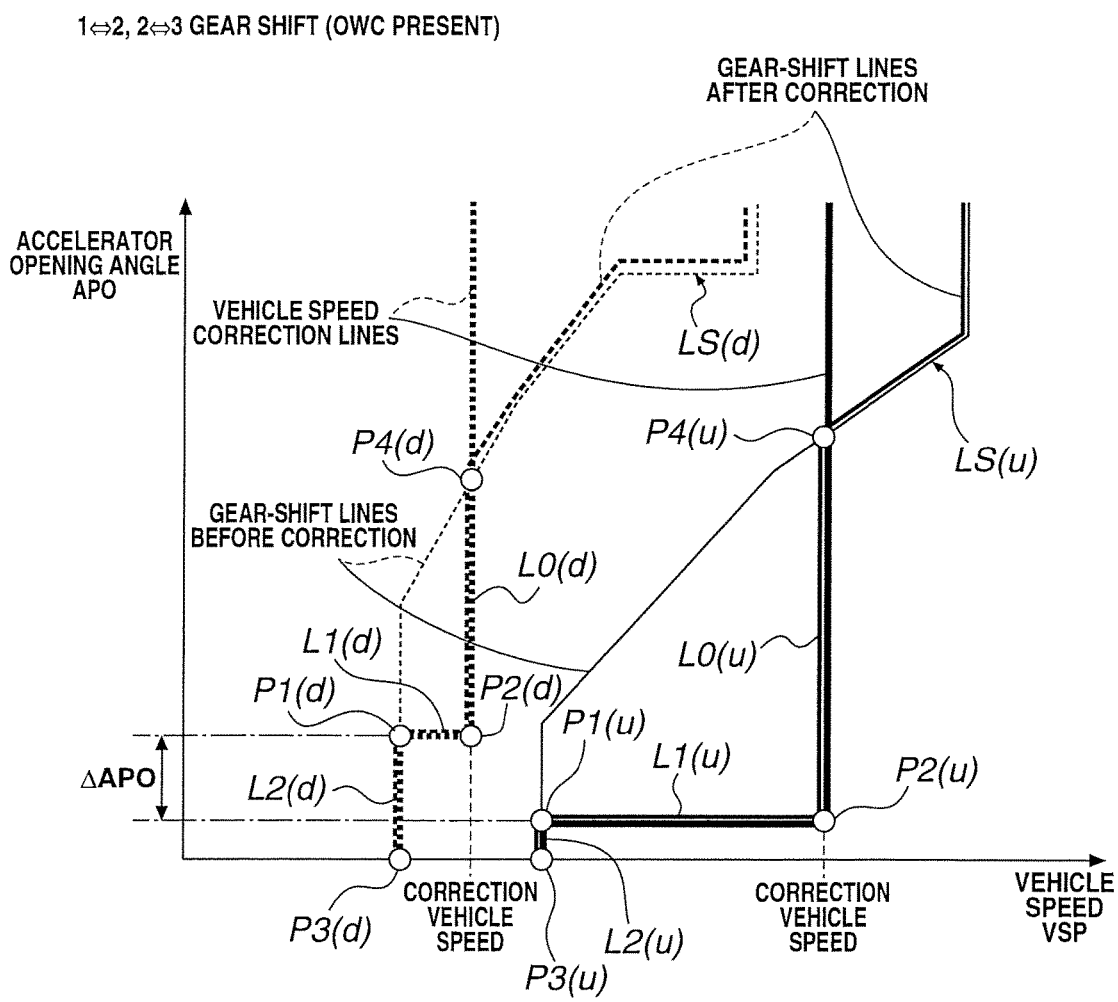
FIG. 7 is an action explanatory view representing a gear-shift line correction action for the up-shift line and the down-shift line, each of the up-shift line and the down shift line having one way clutch, in the gear-shift map.

At step S5, automatic transmission controller 20, subsequently to the determination of engine request [acceptance] at step S4, corrects the gear-shift line map by reflecting the corrected vehicle speed of the gear-shift line calculated at step S1 onto the up-shift line and down-shift line (FIG. 3) of the reference gear-shift and the routine is ended. It should be noted that, when the present gear-shift stage is one of the first, second, and third speed stages, the correction by the small opening angle area coast correction lines is added to the gear-shift line vehicle speed correction of the gear-shift map (FIG. 7). In addition, when the present gear-shift stage is another than the first, the second, and third speed stages, only the gear-shift line vehicle speed correction of the gear-shift map is carried out.

Next, an action will be described. The action of the control apparatus for the automatic transmission AT in the first embodiment will be explained by dividing the action into "a gear-shift line correction control procedure action", "a gear-shift line correction control action", and "a feature and an action of a gear-shift line correction control".

[Gear-Shift Line Correction Control Procedure Action]

The gear-shift line correction control is a control to incorporate a gear-shift line correction function caused by the request from the engine side into the automatic transmission controller. However, for a scene which has a possibility of the problem in a drivability and an automatic transmission performance, a function to reject the engine side request is added. Hereinafter, the gear-shift line correction control procedure action will be explained on a basis of a flowchart in FIG. 4.

When the present gear-shift stage is another than the first, second, and third speed stages, in the flowchart of FIG. 4, the routine goes to step S1→step S2→step S4. Then, at step S1, the correction vehicle speed for the up-shift line and the down-shift line is only calculated using equation (1) described above. On the other hand, when the present gear-shift stage is any one of the first, second, and third speed stages, in the flowchart of FIG. 4, the routine goes to step S1→step S2→step S3→step S4. Then, at step S1, the correction vehicle speed for the up-shift line and down-shift line are calculated using equation (1) and, at step S3, the one way clutch problem corresponding procedure which corrects the gear-shift lines by the small opening angle area coast correction lines is carried out.

At step S4, the automatic transmission controller 20 determines whether the engine request [acceptance] determination has been made. If the engine request [acceptance] determination has been made, the routine goes from step S4 to the end. Hence, no corrections of up-shift lines nor down-shift lines are carried out. That is, if at least one condition of the rejection conditions of the 1, 2, 4, and 6 is established, the gear-shift control using the reference gearshift map shown in FIG. 3 is carried out. It should be noted that if the rejection condition of item 3 that under the gear-shift control is satisfied and, thus, engine request [rejection] determination is established, the gear-shift line correction map before the present gear-shift is held.

At step S4, the automatic transmission controller 20 determines whether the engine request [acceptance] determination has been made. If the engine request [acceptance] determination has been made, the routine goes from step S4 to the end. Hence, no correction of up-shift lines nor down-shift lines are carried out. That is, if at least one condition of the rejection conditions of the 1, 2, 4, and 6 is established, the gear-shift control using the reference gear-shift map shown in FIG. 3 is carried out. It should be noted that if the rejection condition of item 3 that under the gear-shift control is satisfied and, thus, engine request [rejection] determination is established, the gear-shift line correction map before the gear-shift is held.

In a case of the engine request [acceptance] determination at step S4, the routine goes from step S4 to step S5→end.

At step S5, the corrected vehicle speed for the gear-shift lines calculated at step S1 is reflected onto the up-shift line and the down-shift line (FIG. 3) of the reference gear-shift map to correct the gear-shift line map. That is, when the present gear-shift is any one of the first, second, and third speed stages, the correction by the small opening area coast correction line is added to the gear-shift line vehicle speed correction of the gear-shift map.

On the other hand, when the present gear-shift stage is another than the first, second, and third speed stages only the correction of the gear-shift line vehicle speed correction of the gear-shift map is carried out.

In this way, when the engine request [acceptance] determination is established by satisfying all of the above-described six acceptance conditions, the gear-shift line correction function by the request from the engine side is incorporated to correct the gear-shift lines of the gear-shift map. Especially, when the present gear-shift stage is any one of the first, second, and third speed stages, the correction by the small opening angle area coast correction lines is added to the gear-shift line vehicle speed correction of the gear-shift map.

However, when the engine request [rejection] determination is established when at least one condition from among the above-described six rejection conditions is satisfied, the request from the engine side is rejected and the gear-shift lines of the gear-shift map are not corrected. It should herein be noted that the six rejection conditions given by the engine request [rejection] determination provides the condition representing a scene such that there is concern over the driveability and the automatic transmission performance.

[Gear-Shift Line Correction Control Action]

First, a determination method of determining correction lines to correct the gear-shift lines, each having the one-way clutch, in the gear-shift map will be described on a basis of FIG. 6.

A line of the correction vehicle speed calculated at step S1 drawn in parallel to an accelerator opening angle coordinate axis is a vehicle speed correction line L0. As shown in FIG. 6, "a coast correction line opening angle" in the small accelerator opening angle area and "a coast correction line vehicle speed" in a vehicle speed area lower than vehicle speed correction line L0 are given for this vehicle speed correction line L0. Hence, an intersecting point (an intersection) P1 at which the coast correction line opening angle and the coast correction line vehicle speed are intersected, an intersecting point P2 at which the coast correction line opening angle and the vehicle speed correction line L0 are intersected, and an intersecting point P3 at which the coast correction line vehicle speed and the vehicle speed coordinate axis are intersected are determined. A line connecting intersecting point P1 and intersecting point P2 is set as a first coast correction line L1 drawn in parallel to the accelerator opening angle coordinate axis is set as a second coast correction line L2. In this way, the correction lines to correct the gear-shift lines, each having the one way clutch, in the gear-shift map, are determined according to vehicle speed correction line L0, first coast correction line L1, and second coast correction line L2.

Next, a determination method of (post-correction) gear-shift lines after the correction with respect to the up-shift line and down-shift line, each having the one-way clutch, in the gear-shift map, will be described on a basis of FIG. 7.

Vehicle speed correction lines $L0(u)$, $L0(d)$ for the up-shift line (a solid line) and for the down-shift line (a broken line) are line segments connecting intersecting points $P2(u)$, $P2(d)$ and intersecting points $P4(u)$, $P4(d)$ when points at which lines of the correction vehicle speed drawn in parallel to the accelerator opening angle coordinate axis are intersected with (pre-correction) gear-shift lines LS(n), LS(d) before the correction are intersecting points $P4(u)$, $P4(d)$. Then, the coast correction line opening angle of the down-shift line (a broken line) is set to be larger (opening angle) than the coast correction line opening angle (a solid line) of the up-shift line and is set to have an opening angle separation width ΔAPO. Furthermore, the coast correction line vehicle speeds for the up-shift line (a solid line) and down-shift line (a broken line) are respectively made coincident with the vehicle speeds of gear-shift lines LS(n), LS(d) before the correction.

In this way, the (post-correction) gear-shift lines after the correction for the up-shift line and the down-shift line, each having the one way clutch, in the gear-shift map, are the addition of the correction lines in the small accelerator opening angle area to the (pre-correction) gear-shift lines LS(u), LS(d) before the correction left in an accelerator opening angle area larger than intersecting points $P4(u)$, $P4(d)$.

The correction lines in the small accelerator opening angle area are determined according to vehicle speed correction lines $L0(u)$, $L0(d)$, first coast correction lines $L1(u)$, $L1(d)$, and second coast correction lines $L2(u)$, $L2(d)$ (=the small accelerator opening angle area (pre-correction) gear-shift lines LS(u), LS(d) before the correction).

Figure 8:
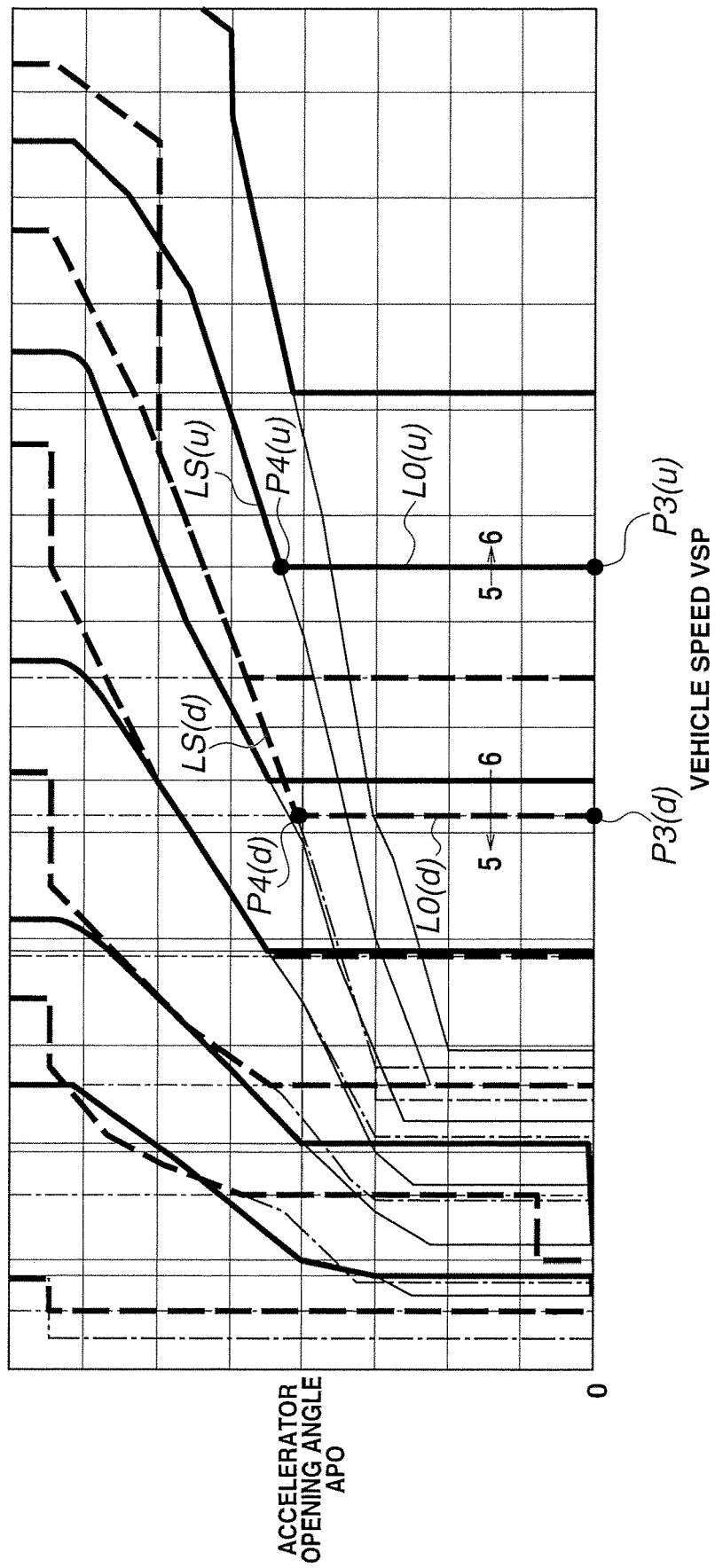
FIG. 8 is a gear-shift map view representing a (post correction) gear-shift line map after the gear-shift line correction used in the gear-shift control when a signal from the engine "X"=8 in the automatic transmission in the first embodiment.
Figure 9:
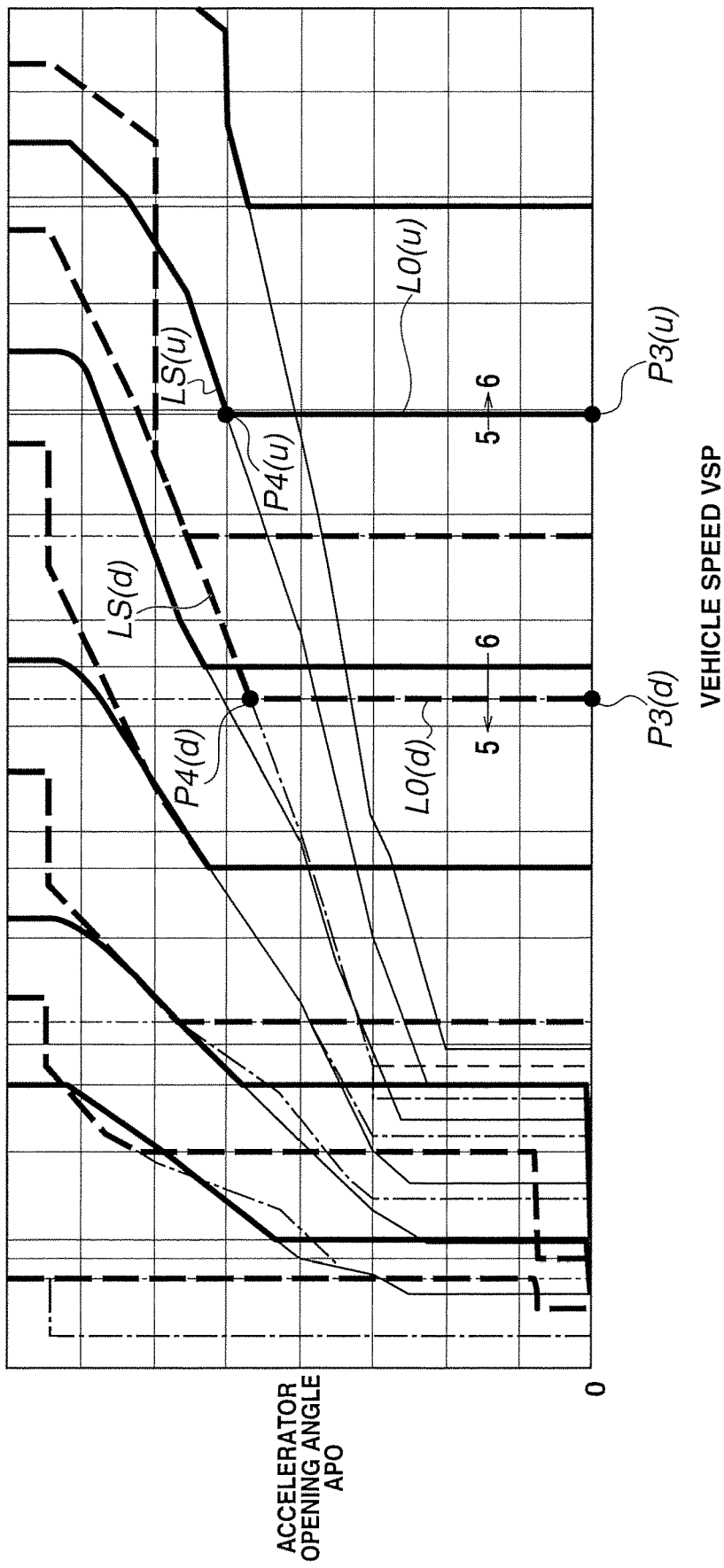
FIG. 9 is a gear-shift map view representing the (post-correction) gear-shift line map after the correction used in the gear-shift control when the signal from the engine "X"=10 in the automatic transmission in the first embodiment.

Next, the determination method of correcting the gear-shift lines, each having no one way clutch, in the gear-shift map will be described on a basis of FIGS. 8 and 9.

Vehicle speed correction lines $L0(u)$, $L0(d)$ of the up-shift line (the solid line) and the down-shift line (the broken line) are lines connecting intersecting points $P3(u)$, $P3(d)$ at which the lines on which each of the correction vehicle speeds is drawn in parallel to the accelerator opening angle coordinate axis are intersected with the vehicle speed coordinate axis and intersecting points $P4(u)$, $P4(d)$ when points at which the lines on which each of the correction vehicle speeds is drawn in parallel to the accelerator opening angle coordinate axis are intersected with the (pre-correction) gear-shift lines LS(u), LS(d) before the correction are intersecting points $P4(u)$, $P4(d)$. In this way, the (post-correction) gear-shift lines after the correction for the up-shift lines and the down-shift lines, each having no one way clutch, in the gear-shift map are the addition of vehicle speed correction lines $L0(u)$, $L0(d)$ in the smaller accelerator opening angle area than intersecting points $P4(u)$, $P4(d)$ to the pre-correction gear-shift lines L0($u$), L0($d$) (before the correction) left in the larger accelerator opening angle area than intersecting points P4($u$), P4($d$). Then, as appreciated from a comparison between a 5→6 up-shift line and a 6→5 down-shift line respectively shown in FIGS. 8 and 9, vehicle speed correction lines L0 are set to be toward a higher vehicle speed side as the gear-shift correction request becomes higher.

In other words, as the gear-shift line correction request becomes higher, vehicle speed correction lines L0($u$), L0($d$) are set toward a higher vehicle speed side so that a region in which a low speed stage at which a transmission input rotation speed (=engine rotation speed) becomes high is maintained is enlarged.

Figure 10:
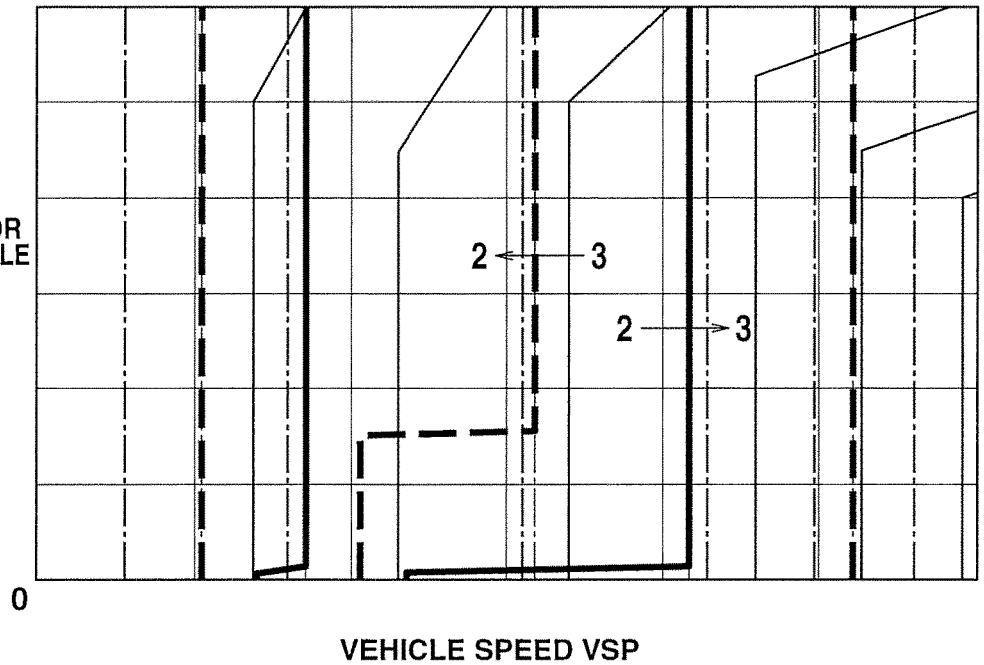
FIG. 10 is a gear-shift map enlarged view representing the (post-correction) gear-shift line map after the correction used in the gear-shift control when the signal from the engine "X"=8 in which a low vehicle speed·small accelerator opening angle area is enlarged.
Figure 11:
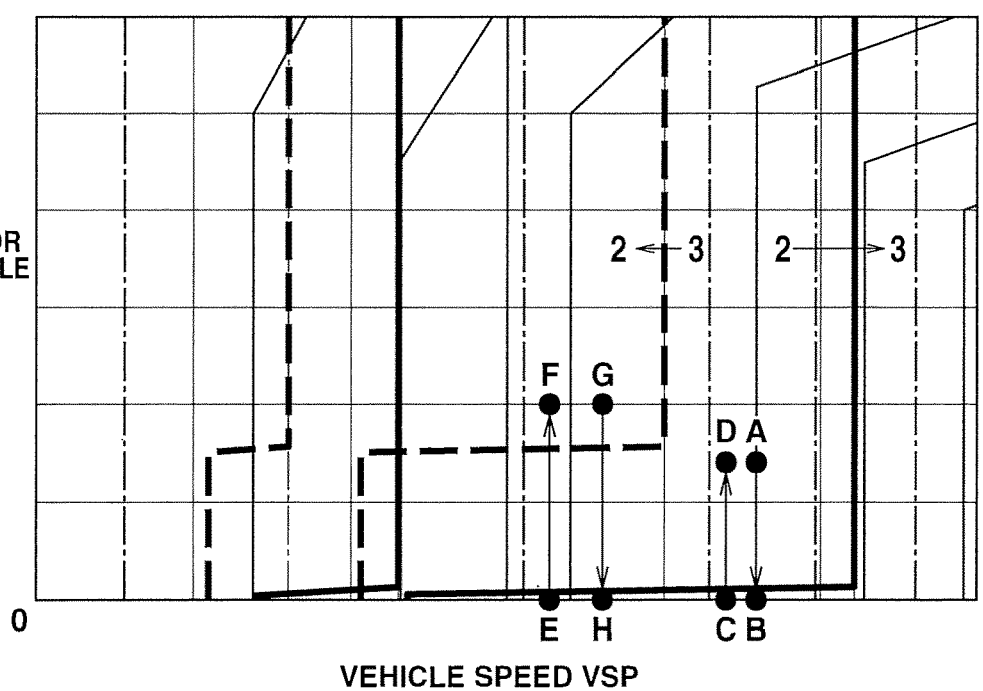
FIG. 11 is a gear-shift map enlarged view representing the (post-correction) gear-shift line map after the correction used in the gear-shift control when the signal from the engine "X"=10 in which the low vehicle speed·small accelerator opening angle area is enlarged.

It should herein be noted that, as appreciated from the comparison between FIGS. 10 and 11, in the small opening angle area coast correction line correction in the (post-correction) gear-shift lines after the correction for the up-shift lines and the down-shift lines, each having the one way clutch, in the gear-shift map, as the signal "X" from the engine becomes larger, a projection quantity of the correction becomes larger toward the lower vehicle speed side. This reason is that the coast correction line vehicle speed is made coincident with the vehicle speed of (pre-correction) gear-shift lines LS($u$), LS($d$) before the correction and, as the signal of "X" from the engine becomes larger, vehicle speed correction lines L0($u$), L0($d$) are set toward a higher vehicle speed side.

[Feature and Action of a Gear-Shift Line Correction Control]

In the first embodiment, the gear-shift line correction is added to the up-shift lines of the first, second, and third speed stages in which at least one of first one way clutch F1 and second one way clutch F2 participates, from among the (post-correction) gear-shift lines after the correction by vehicle speed correction lines L0($u$), L0($d$). The gear-shift line correction is structured according to first coast correction line L1($u$) and second coast correction line L2($d$) which serve to project the small accelerator opening angle area including zero accelerator opening angle toward the lower vehicle speed side.

That is, when the accelerator foot separation operation is carried out and the driving point is transferred from driving point A in FIG. 11 to driving point B in FIG. 11, accelerator opening angle APO is reduced and the driving point traverses first coast correction line L1($u$) which corrects the up-shift line. Thus, the 2→3 up-shift is carried out by the engagement of second clutch C2 which has been released without use of second one way clutch F2. Therefore, even if the accelerator foot separation operation is carried out, second one way clutch F2 does not run idle.

Thus, even if the accelerator depression operation is carried out from the accelerator foot separation state and the driving point is transferred from a driving point C in FIG. 11 to a driving point D in FIG. 11, the third speed stage after the 2→3 up-shift is maintained and second one way clutch F2 does not engage. It should be noted that, since the post-correction 3→2 down-shift line after the correction caused by vehicle speed correction lines L0($u$), L0($d$) is set toward the lower vehicle speed side than the 2→3 up-shift line, the down-shift is not carried out unless such a vehicle speed change as to traverse the 3→2 down-shift line occurs.

Consequently, the up-shift line and the down-shift line in the gear-shift map are corrected with vehicle speed correction lines L0($u$), L0($d$) set toward the higher vehicle speed side than the pre-correction line vehicle speed and the engine rotation speed is maintained at a high rotation speed. In addition, when the accelerator depression operation is again carried out from the accelerator foot separation operation, a worsening of a feeling and a generation of a one way clutch engagement shock in such a case of the gear-shift line correction according to first coast correction line L1($u$) and second coast correction line L2($u$) is not present are prevented from occurring.

In the first embodiment, when the gear-shift line correction request is present from the engine warm-up promotion control promoting the warm-up of engine Eng, as the value of "X" which is the gear-shift line correction request becomes larger, the correction vehicle speeds at the higher vehicle speed side are determined (S1 in FIG. 4). Then, the up-shift lines and the down-shift lines in the gear-shift map are gear-shift line corrected by vehicle speed correction lines L0($n$), L0($d$) drawn in parallel to the accelerator opening angle coordinate axis from the correction vehicle speeds.

That is, as the up-shift lines and the down-shift lines in the gear-shift map are set toward the higher vehicle speed side, a lower speed stage is maintained for a long term during a traveling and the transmission input rotation speed becomes higher. When the transmission input rotation speed becomes higher, the rotation speed of engine Eng mounted in the vehicle as the driving source becomes higher so that the warm-up of engine Eng can be promoted. Hence, in accordance with the correction request of the gear-shift lines from the engine warm-up promotion control, a high engine warm-up effect can be obtained.

In the first embodiment, the coast correction line opening angle in the small accelerator opening angle area and the coast correction line vehicle speed which is lower vehicle speed than the correction vehicle speeds are determined. Then, the coast correction lines are correction lines constituted by first coast correction line L1($u$) drawn in parallel to the vehicle speed coordinate axis from the coast correction line opening angle and second correction line L2($u$) drawn in parallel to the accelerator opening angle coordinate axis from the coast correction line vehicle speed.

That is, the coast correction lines are provided by first coast correction line L1($u$) and second coast correction line L2($u$) by the determination of the coast correction line opening angle in the small accelerator opening angle area and of the coast correction line vehicle speed which is lower vehicle speed than the correction vehicle speed. Hence, through such a simple processing as the determination of the coast correction line opening angle and the coast correction line vehicle speed, the coast correction lines according to the small opening area coast correction line are drawn in the gear-shift map.

In the first embodiment, the gear-shift line correction is added to the down-shift lines at the first second, and third speed stages, each stage of which at least one of first one way clutch F1 and second one way clutch F2 is engaged during the driving, from among the (post-correction) gear-shift lines after the correction by the vehicle speed correction lines L0($u$), L0($d$).

The correction of the shift lines is carried out by first coast correction line L1($d$) and second coast correction line L2($d$) which serve to project the small accelerator opening angle area including zero accelerator opening angle toward the lower vehicle speed side. For example, if the coast correction line is present in the down-shift lines, the corresponding down-shift is not carried out even when the accelerator depression operation is again carried out from the accelerator foot separation state and the rise in the engine rotation speed cannot be expected.

On the contrary, if the coast correction line is present in each of the down-shift lines, accelerator opening angle APO is raised and the driving point traverses first coast correction line L1(*d*) when the accelerator depression operation is again carried out from the accelerator foot separation state and the driving point is transferred from driving point E in FIG. 11 to driving point F. Then, the 3→2 down-shift in the drive state is carried out by the release of second clutch C2 and the mechanical engagement of second one way clutch F2.

Hence, when the depression operation is again carried out from the accelerator foot separation from the accelerator foot separation state, the rise in the engine rotation speed caused by the down-shift operation is achieved. Then, this rise in the engine rotation speed can more increase the warm-up promotion effect.

In the first embodiment, the coast correction line vehicle speeds of second coast correction lines L2(*u*), L2(*d*) drawn on the up-shift lines and the down-shift lines in the gear shift map provide the vehicle speeds of the up-shift lines and the down-shift lines before the correction. That is, the coast correction line vehicle speeds determining second coast correction lines L2(*u*), L2(*d*) can easily be set. Then, a coast up-shift due to the accelerator foot separation operation and a drive down-shift due to the accelerator re-depression operation provide the same gear-shift control in the gear-shift map before the correction.

Hence, while making an easy setting of the coast correction line vehicle speed, the coast up-shift and the drive down-shift without discomfort (un-match) feeling are achieved.

In this embodiment, the coast correction line opening angle of first coast correction line L1(*d*) drawn on each of the down-shift lines in the gear-shift map is set to be larger (opening angle) than the coast correction line opening angle of first coast correction line L1(*u*) drawn on each of the up-shift lines in the gear-shift map.

That is, when the coast correction line vehicle speeds of second coast correction lines L2(*u*), L2(*d*) are the vehicle speeds of the pre-correction up-shift lines before the correction, first coast correction line L1(*d*) and first coast correction line L1(*u*) are sometimes overlapped in the vehicle speed coordinate axis direction, as shown in FIGS. 10 and 11. Hence, when the accelerator depression operation is again carried out from the accelerator foot separation operation in order for the driving point to be transferred as G→H→E→F in FIG. 11, the 3→2 down-shift is carried out after the 2→3 up-shift. At this time, if the coast correction line opening angles of first coast correction line L1(*d*) and first coast correction line L1(*u*) are mutually the same opening angle or mutually closing opening angles, the 3→2 down-shift is started before the end of the 2→3 up-shift.

On the contrary, since the coast correction line opening angle of first coast correction line L1(*d*) is made larger than first coast correction line L1(*u*), after the 2→3 up-shift, a sufficient drive driving state is passed, and, thereafter, the 3→2 down-shift is carried out.

Hence, when the accelerator depression operation is again carried out from the accelerator foot separation operation, subsequently to the end of the up-shift, the down-shift is started.

In the first embodiment, when automatic transmission AT is determined to be under the gear-shift (operation), the gear-shift line correction is rejected under the gear-shift (operation) (NO at step S4 in FIG. 4), the gear-shift map made by the gear-shift lines before the correction is held. That is, if the gear-shift line correction of the gear-shift map is carried out under the gear-shift (operation) of automatic transmission AT is carried out, the gear-shift is often intervened in spite of the fact that accelerator opening angle APO is held and a risk of reductions in a driveablity and a gear-shift performance occurs.

Hence, since the gear-shift map made by the gear-shift lines before the gear-shift is held while the gear-shift (operation) is being carried out, the reductions of the driveablity and the gear-shift performance are prevented.

Next, effects will be explained.

In the control apparatus for automatic transmission AT in the first embodiment, the following effects can be obtained.

(1) In a drive train, a driving source (engine Eng) and an automatic transmission AT having a plurality of gear-shift stages including the gear-shift stages (first, second and third speed stages) at each of which a one way clutch (a first one way clutch F1 and a second one way clutch F2) is engaged during a drive are equipped, there is provided with a control apparatus for an automatic transmission AT comprising gear-shift control means (transmission controller 20) for performing a gear-shift control for the automatic transmission AT according to a position of a driving point (VSP, APO) present in a gear-shift map, using the driving point determined according to a vehicle speed VSP and an accelerator opening angle APO and a gear-shift map constituted by up-shift lines and down-shift lines, wherein the control apparatus further comprises gear-shift line correction control means (FIG. 4) for correcting the up-shift lines and the down-shift lines in the gear-shift map according to vehicle speed correction lines L0(*u*), L0(*d*), each vehicle speed correcting line being set toward a higher vehicle speed side than a corresponding gear-shift line vehicle speed before a correction, when a gear-shift line correction request occurs, and the gear-shift line correction control means (FIG. 4) adds a gear-shift line correction such that a correction quantity toward a higher vehicle speed side in a small accelerator opening angle area is made smaller than another correction quantity toward the higher vehicle speed side in a large acceleration opening angle area whose accelerator opening angle is larger than the small accelerator opening angle area to the up-shift lines of the gear-shift stages (first, second and third speed stages) at each of which the one way clutch is engaged during the drive from among post-correction gear-shift lines after the correction according to the vehicle speed correction lines L0(*u*), L0(*d*).

In other words, the gear-shift line correction control means (FIG. 4) adds the gear-shift line correction by coast correction lines (first coast correction line L1(*u*), second coast correction line L2(*u*)) which serve to project the small accelerator opening area including zero accelerator opening angle toward a lower vehicle speed side to the up-shift lines of the gear-shift stages at each of which the one way clutch (first one way clutch F1, second one way clutch F2) participates, from among the post-correction gear-shift lines after the correction according to vehicle speed correction lines L0(*u*), L0(*d*).

Therefore, when the accelerator foot separation operation is carried out and, thereafter, the accelerator depression operation is again carried out while rotation numbers of the driving source (engine Eng) (the engine rotation speed) is maintained at a high rotation number (speed), the worsening of a drive feeling and generation of a one way clutch engagement shock can be prevented.

(2) engine Eng is mounted as the driving source and the gear-shift line correction control means (FIG. 4) determines the correction vehicle speed toward the higher vehicle speed side as the gear-shift line correction request (value of "X") becomes larger (step S1) and performs the gear-shift line correction for each of the up-shift lines and the down-shift lines in the gear-shift map according to vehicle speed correction lines L0(*u*), L0(*d*) drawn in parallel to the accelerator opening angle coordinate axis from the correction vehicle speeds. Hence, in addition to the effect described in item (1), in accordance with the gear-shift line correction request from the engine warm-up promotion control, a high warm-up promotion effect of engine Eng can be promoted.

(3) The gear-shift line correction control means (FIG. 4) determines the coast correction line opening angle in the small accelerator opening angle area and the coast correction line vehicle speed which is lower than the correction vehicle speed and provides the correction lines constituted by first coast correction line L1(*u*) drawn in parallel to the vehicle speed coordinate axis from the coast correction line opening angle and second coast correction line L2(*u*) drawn in parallel to the accelerator opening angle coordinate axis from the coast correction line vehicle speed (FIG. 6).

Hence, through a simple processing in which only the coast correction line opening angle and the coast correction line vehicle speed are determined, the coast correction lines by the small opening angle area coast correction lines can be depicted in the gear-shift map.

(4) The gear-shift line correction control means (FIG. 4) adds the gear-shift line correction according to coast correction lines (first coast correction line L1(*d*), second coast correction line L2(*d*)) which serve to project the small accelerator opening angle area including zero accelerator opening angle toward the lower vehicle speed side to the down-shift lines at the gear-shift stages (first (1), second (2), and third (3) speed stages) at which the one way clutch (first one way clutch F1, second one way clutch F2) is engaged during the drive, from among the post-correction gear-shift lines after the correction according to vehicle speed correction lines L0(*u*), L0(*d*). Therefore, in addition to the effects described in items (1) through (3), when the accelerator depression operation is again carried out from the accelerator foot separation state, a rise in the driving source rotation speed (the engine rotation speed) due to the down-shift can be achieved.

(5) The gear-shift line correction control means (FIG. 4) sets the coast correction line vehicle speeds of second coast correction lines L2(*u*), L2(*d*) drawn on the respective up-shift lines and the down-shift lines in the gear-shift map to be the vehicle speeds of the (pre-correction) up-shift lines and the down-shift lines before the correction.

Hence, in addition to the effect described in item (4), while making the setting of the coast correction line vehicle speeds easy, the coast correction line vehicle speed, the coast up-shift and the drive down-shift can be achieved without discomfort (un-match) feeling.

(6) The gear-shift line correction control means (FIG. 4) sets the coast correction line opening angle of first coast correction line L1(*d*) drawn on each of the down-shift lines of the gear-shift map to have the larger opening angle than the coast correction line L1(*u*) drawn on each of the up-shift lines in the gear-shift map.

Hence, in addition to the effect described in item (5), when the accelerator foot separation operation, subsequently to the end of one of the up-shifts, a corresponding one of the down-shifts is carried out.

(7) When the gear-shift line correction control means (FIG. 4) determines that automatic transmission AT is under the gear-shift, the gear-shift line correction under the gear-shift (No at step S4) is rejected, the gear-shift map according to the gear-shift lines before the gear-shift is held. Hence, in addition to the effects described in items (1) through (6), since the gear-shift lines before the gear-shift is held, the reductions of the driveability and the gear-shift performance can be prevented.

As described hereinbefore, the control apparatus for the automatic transmission has been described on a basis of the first embodiment. However, specific structures are not limited to this first embodiment and various design modifications and additions are allowed unless a departure from a gist of the invention related to each claim in the scope of the claims is made.

In the first embodiment, as the gear-shift correction control means, the example of the addition of the small opening angle area coast correction according to the coast correction lines to the up-shift lines and the down-shift lines at the first, second, and third speed stages at each of which at least one of first one way clutch F1 and second one way clutch F2 are engaged during the drive has been described. However, another example of the addition of the small opening angle area coast correction line gear-shift line correction according to the coast correction lines to only the up-shift lines in which the one way clutch is engaged in the drive may be adopted as the example.

In the first embodiment, as the gear-shift line correction control means, the example in which, when the gear-shift line correction request from the engine warm-up promotion control promoting the warm-up of engine Eng occurs, the gear-shift line correction according to the vehicle speed correction lines and the coast correction lines is carried out. However, as gear-shift line correction control means, when the gear-shift line correction request occurs from a vehicle control other than the engine warm-up promotion control (for example, a traveling mode control for switching to a sport traveling mode and so forth), another example in which the gear-shift line correction according to the vehicle speed correction line and the coast correction line is carried out may be included as another example of the gear-shift line correction by the vehicle speed correction line and the coast correction line.

In the first embodiment, the example in which the control apparatus according to the present invention is applied to the engine mounted vehicle in which the automatic transmission of the stepped type of forward 7-th speed, reverse 1-st speed has been explained. However, the number of gear-shift stages and so forth are not limited to the first embodiment if the applied transmission is the automatic transmission having a plurality of gear-shift stages at which the one way clutch is engaged during the drive. In addition, the applied vehicle can include an electrically driven vehicle such as a hybrid vehicle, an electric vehicle, or so forth other than the engine (mounted) vehicle.

The invention claimed is:

1. A gear-shift control apparatus for an automatic transmission, wherein, in a drive train, a driving source and the automatic transmission having a plurality of gear-shift stages including gear-shift stages at each of which a one way clutch is engaged during a drive state are provided, the control apparatus comprising:

a controller configured to
perform a gear-shift control for the automatic transmission according to a position of a driving point present in a gear-shift map, the driving point being determined according to a vehicle speed and an accelerator opening angle and the gear-shift map comprising up-shift lines and down-shift lines;
correct the up-shift lines and the down-shift lines in the gear-shift map by vehicle speed correction lines, each of the vehicle speed correction lines being set toward a higher vehicle speed side than a corresponding gear-shift line vehicle speed before a correction, when a gear-shift line correction request occurs, and add a gear-shift line correction to form an area defined by a predetermined first accelerator opening angle to project coast correction lines towards a lower vehicle speed to the up-shift lines of the gear-shift stages at each of which the one way clutch is employed from among gear-shift lines after the correction by the vehicle speed correction lines.

2. The gear-shift control apparatus for the automatic transmission as claimed in claim 1, wherein the driving source comprises an engine which is mounted, and the controller is configured to determine the correction vehicle speed at the higher vehicle speed side as the gear-shift line correction request becomes larger when the gear-shift line correction request from an engine warm-up promotion control, which promotes warm-up of the engine, occurs and perform the gear-shift line correction for the up-shift lines and the down-shift lines in the gear-shift map by the vehicle speed correction lines, each of the vehicle speed correction lines being drawn in parallel to an accelerator opening angle coordinate axis from the correction vehicle speed.

3. The gear-shift control apparatus for the automatic transmission as claimed in claim 2, wherein the controller is configured to determine a coast correction line opening angle in the area defined by the predetermined first accelerator opening angle and a coast correction line vehicle speed which is the lower vehicle speed than the correction vehicle speed, and the coast correction lines are correction lines including a first coast correction line drawn in parallel to a vehicle speed coordinate axis from the coast correction line opening angle and a second coast correction line drawn in parallel to the accelerator opening angle coordinate axis from the coast correction line vehicle speed.

4. The gear-shift control apparatus for the automatic transmission as claimed in claim 3, wherein the controller is configured to set coast correction line vehicle speeds of second coast correction lines drawn on the up-shift lines and the down-shift lines in the gear-shift map to be vehicle speeds of the up-shift lines and the down-shift lines in the gear-shift map before the correction.

5. The gear-shift control apparatus for the automatic transmission as claimed in claim 4, wherein the controller is configured to set the coast correction line opening angle of the first coast correction line drawn on each of the down-shift lines in the gear-shift map to an opening angle larger than the coast correction line opening angle of the first coast correction line drawn on the up-shift lines of the gear-shift map.

6. The gear-shift control apparatus for the automatic transmission as claimed in claim 1, wherein the controller is configured to add the gear-shift line correction by the coast correction lines which project the predetermined first accelerator opening angle, including a zero accelerator opening angle, toward the lower vehicle speed side to the down-shift lines of the gear-shift stages at each of which the one way clutch is engaged during the drive state from among the gear-shift lines after the correction by the vehicle speed correction lines.

7. The gear-shift control apparatus for the automatic transmission as claimed in claim 1, wherein the controller is configured to reject the gear-shift line correction when determining that the automatic transmission is under a gear-shift and maintain the gear-shift map having the gear-shift lines before the gear-shift.

8. A gear-shift control apparatus for an automatic transmission, wherein, in a drive train, a driving source and the automatic transmission having a plurality of gear-shift stages including gear-shift stages at each of which a one way clutch is engaged during a drive state are provided, the control apparatus comprising:

a controller configured to perform a gear-shift control for the automatic transmission according to a position of a driving point present in a gear-shift map, the driving point being determined according to a vehicle speed and an accelerator opening angle and the gear-shift map comprising up-shift lines and down-shift lines;

correct the up-shift lines and the down-shift lines in the gear-shift map by vehicle speed correction lines, each of the vehicle speed correction lines being set toward a higher vehicle speed side than a corresponding gear-shift line vehicle speed before a correction, when a gear-shift line correction request occurs, and provide a coast correction line vehicle speed at a lower vehicle speed than a corresponding one of the vehicle speed lines at an accelerator opening angle equal to or below a predetermined coast correction line opening angle in an area defined by a predetermined first accelerator opening angle, and add a gear-shift line correction by forming a coast correction line by connecting the coast correction line vehicle speed at the coast correction line opening angle and a correction vehicle speed by the vehicle speed correction line to each of the up-shift lines of the gear-shift stages at each of which the one way clutch is engaged during the drive state from among gear-shift lines after the correction by the vehicle speed correction lines.

9. The gear-shift control apparatus for the automatic transmission as claimed in claim 8, wherein the driving source comprises an engine which is mounted, and the controller is configured to determine the correction vehicle speed at the higher vehicle speed side as the gear-shift line correction request becomes larger when the gear-shift line correction request from an engine warm-up promotion control, which promotes warm-up of the engine, occurs, and perform the gear-shift line correction for the up-shift lines and the down-shift lines in the gear-shift map by the vehicle speed correction lines, each of the vehicle speed correction lines being drawn in parallel to an accelerator opening angle coordinate axis from the correction vehicle speed.

* * * * *